Sept. 4, 1962 R. E. GRANTHAM ET AL 3,052,032
DOPPLER-FREQUENCY CURVE PLOTTER
Filed Sept. 4, 1958 6 Sheets-Sheet 1

INVENTORS.
R. E. GRANTHAM
L. HARDIS

BY

ATTYS.

Sept. 4, 1962  R. E. GRANTHAM ET AL  3,052,032
DOPPLER-FREQUENCY CURVE PLOTTER
Filed Sept. 4, 1958  6 Sheets-Sheet 2

FIG.3.

(a) DOPPLER-FREQ. VS. TIME CURVE $$f_{pa} = -\frac{V_r}{\lambda_p} \frac{(t-t_d)}{\sqrt{(t-t_d)^2 + \left(\frac{D}{V_r}\right)^2}}$$

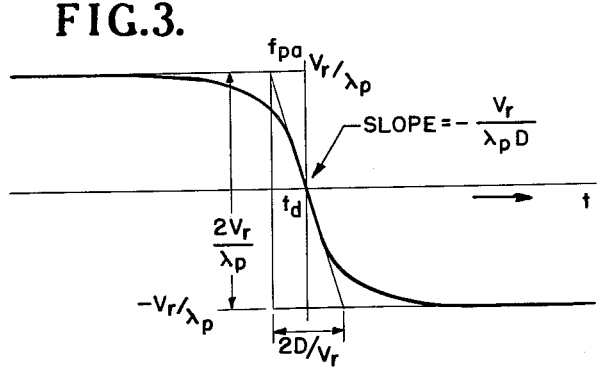

(b) RECORD TRACE $$y = -\frac{V_r}{K_f \lambda_p} \frac{x}{\sqrt{x^2 + \left(\frac{K_t D}{V_r}\right)^2}}$$

Where
$x = K_t(t-t_d)$
$y = \dfrac{f_{pa}}{K_f}$

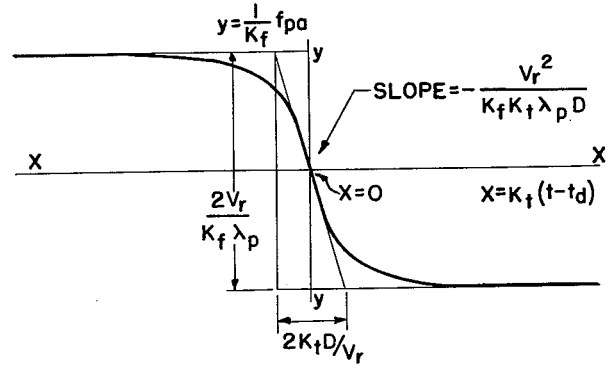

(c) GENERALIZED CURVE $$y = -a \frac{x}{\sqrt{x^2 + b^2}}$$

Where
$a = \dfrac{V_r}{K_f \lambda_p}$
$b = \dfrac{K_t D}{V_r}$

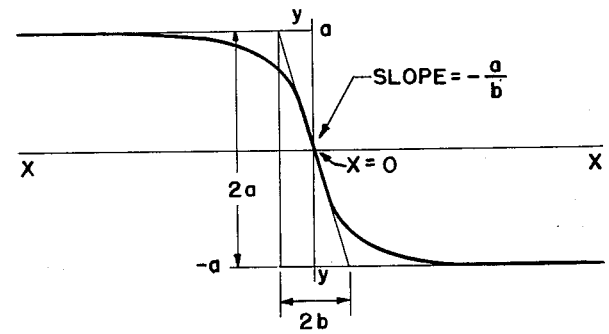

FIG.7.

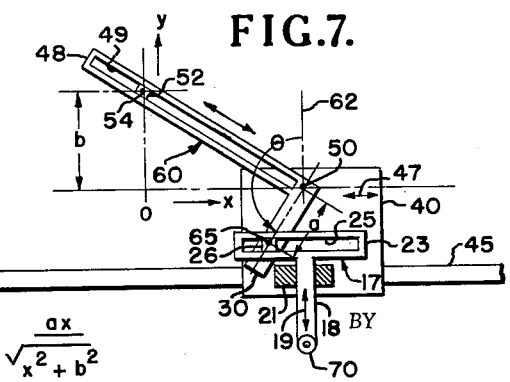

$$y = a \cos\theta = -\frac{ax}{\sqrt{x^2 + b^2}}$$

INVENTORS.
R. E. GRANTHAM
L. HARDIS

BY
ATTORNEYS

Sept. 4, 1962  R. E. GRANTHAM ET AL  3,052,032
DOPPLER-FREQUENCY CURVE PLOTTER
Filed Sept. 4, 1958  6 Sheets-Sheet 3

INVENTORS.
R. E. GRANTHAM
L. HARDIS
BY
ATTYS.

Sept. 4, 1962  R. E. GRANTHAM ET AL  3,052,032

DOPPLER-FREQUENCY CURVE PLOTTER

Filed Sept. 4, 1958  6 Sheets-Sheet 6

INVENTORS.
R. E. GRANTHAM
L. HARDIS

BY

ATTYS.

3,052,032
DOPPLER-FREQUENCY CURVE PLOTTER
Rodney E. Grantham, Bethesda, and Leonard Hardis, Silver Spring, Md., assignors to the United States of America as represented by the Secretary of the Navy
Filed Sept. 4, 1958, Ser. No. 759,107
7 Claims. (Cl. 33—27)
(Granted under Title 35, U.S. Code (1952), sec. 266)

The invention described herein may be manufactured and used by or for the Government of the United States of America for governmental purposes without the payment of any royalties thereon or therefor.

The present invention relates generally to an adjustable mechanical instrument or apparatus for tracing or generating a family of predeterminedly configured curves to enable analyzation of data represented by the curves, and more particularly to a curve-plotting device having two adjustments for drawing a family of Doppler frequency curves and for ascertaining a pair of arbitrary constants which enable the determination of analysis data from Doppler-frequency versus time curves.

It is a well known phenomenon that, when a source of electromagnetic energy has motion relative to an object which reflects or receives the electromagnet energy, the frequency of the electromagnetic energy reflected or received by the object at any instant is shifted an incremental amount proportional to the instantaneous radial component of velocity between the source and object, such phenomenon being commonly referred to in the electronics art as the Doppler frequency-shift effect. Inasmuch as the instantaneous radial component of velocity between a moving source of energy and object is dependent upon the instantaneous distance therebetween, the changing distance between source and object is also a function determining the extent of the Doppler frequency shift. From the known factors involved in determining the Doppler frequency shift, it has been scientifically established that the Doppler frequency shift at any given instant, for an electromagnetic energy source approaching and passing an object, may be determined from the equation (1) $$f_{pa} = \frac{V_r}{\lambda_p} \cos \theta$$

where:
$f_{pa}$ is the Doppler frequency shift. $V_r$ is the magnitude of the relative velocity vector.
$\theta$ is the angle between the line from the source to object and the relative velocity vector.
$\lambda_p$ is the wavelength of the electromagnetic energy from the source.

Since the angle $\theta$ is a changing function of the shortest distance between the source and object and is continually varying as the source approaches and passes by the object, the angle $\theta$ may be represented in coordinates of time. By plotting the Doppler frequency versus time in rectangular coordinates, the characteristic obtained is a curve which is represented by Equation 1 and the dimensions of which are a function of the shortest possible distance between the source and object in motion and of the relative velocity therebetween. The determination of the functional factors of the curve dimensions is effected by converting $\cos \theta$ of Equation 1 into its vector components from the geometry of the moving source-moving object intercept and substituting the vector equivalent of $\cos \theta$ in Equation 1 to transform Equation 1 to:

(2) $$f_{pa} = \frac{V_r}{\lambda_p} \frac{(t-t_d)}{\sqrt{(t-t_d)^2 + \left(\frac{D}{V_r}\right)^2}}$$

where $t$ and $t_d$ represent respectively time and time of closest approach between the moving object and the moving source and where D is the distance between the moving object and the moving source at the time of closest approach, i.e. instant the moving object and moving source pass each other. Since the coordinate scale factors of the curve represented by Equation 2 vary correlatively with changes in relative velocity and in the shortest possible distance between moving object and moving source, the variable coordinate parameters of Equation 2 may be ascertained and utilized to determine relative velocity, the distance between source and object at the time of closest approach (miss distance between a moving target and moving projectile), and the time of closest approach with respect to a reference instant of time.

As a consequence of the information available on Doppler-frequency versus time curves, the obtention and analysis of such curves have been resorted to in the field of ordnance evaluation as a means to provide highly accurate data concerning the shot distribution of anti-aircraft gunnery and the accuracy of fire control systems and VT fuzes. In order to obtain Doppler-frequency versus time characteristics, the procedure generally employed consists of firing a projectile, which carries a continuous wave transmitter, toward a target-aircraft on which is mounted a receiver including circuitry for determining the instantaneous Doppler-frequency shifts which are recorded as a function of time on a recorder that is synchronized the projectile-launching station fire control system to produce a Doppler-frequency versus time record trace for the particular projectile-target intercept under evaluation. Since recorder deflection sensitivity and speed of the recorder paper are involved during the operations of the recorder, these factors are introduced into the recorded Doppler-frequency versus time curve and its representative Equation 2, thereby resulting in a record trace defined by the equation:

(3) $$\frac{f_{pa}}{k_f} = -\frac{V_r}{k_f \lambda_p} \frac{K_t(t-t_d)}{\sqrt{K_t^2(t-t_d)^2 + \left(\frac{K_t D}{V_r}\right)^2}}$$

where $K_f$ is the recorder deflection sensitive in cycles per second per unit length and where $K_t$ is the velocity of the photographic film or paper in the recorder in unit length per second. Expressing Equation 3 in rectangular coordinates of X and Y which are respectively the abscissa and ordinate, Equation 3 takes the equation form:

(4) $$Y = -\frac{V_r}{K_f \lambda_p} \frac{X}{\sqrt{X^2 + \left(\frac{K_t D}{V_r}\right)^2}}$$

where Y is the vertical frequency dimension and is given by the equation:

(5) $$Y = \frac{f_{pa}}{K_f}$$

and where X is the horizontal time dimension and is given by equation:

(6) $$X = K_t(t-t_d)$$

Therefore, Equation 4 is the general equation, in rectangular coordinates, of the recorded Doppler-frequency versus time curves.

In lieu of recording the Doppler-frequency versus time curves on the target-aircraft as aforedescribed, it is the preferable practice to employ a transponder on the target-aircraft to telemeter the Doppler frequencies to the launching station where they are recorded to produce a Doppler-frequency versus time curve. A highly refined telemetering system for obtaining Doppler-frequency versus time curves is described and claimed in the copending application of R. E. Grantham et al., Serial No. 759,106, filed September 4, 1958, assigned to the same assignee and identified as Navy Case No. 19,179. Miss distance, magnitude of relative velocity between target-aircraft and projectile, and the time of closest approach are determined by analysis of the recorded Doppler-frequency versus time curves obtained in any of the aforedescribed manners and defined by Equation 4.

Heretofore, the recorded Doppler-frequency versus time curves were analyzed by either the slope method or the integration method. The slope method is unsatisfactory due to the difficulty experienced in determining maximum slope on the curve and also due to requiring approximations in determining values, such approximations resulting in the introduction of errors. The integration method involves the use of a planimeter to measure several areas of the record and a nomograph to calculate the answer. The disadvantages of this method are the excessive time required for analyzing a curve, complexity of operations, and reduced accuracy when noise is present on the cruve.

The general purpose of this invention is to provide a Doppler-frequency versus time curve analyzer which is accurate, simple and positive in operation, substantially unaffected by noise on the curve, faster than prior art methods in analyzing the curve, and capable of being operated by unskilled personnel. In attaining these objectives, the present invention contemplates the provision of a novel mechanical curve plotter constructed to plot ideal Doppler-frequency versus time curves and having two calibrated manual adjustment for selectively establishing a pair of adjustable parameters which represent miss distance and relative velocity factors.

In carrying out the present invention in its basic form, a pair of arbitrary parameters, $a$ and $b$, are substituted into Equation 4 resulting in an equation having the form:

$$(7) \quad Y = -\frac{ax}{\sqrt{X^2+b^2}}$$

where $$(8) \quad a = \frac{V_r}{\lambda_p K_F}$$

$$(9) \quad b = \frac{K_t D}{V_r}$$

It is to be noted that, if Equations 5, 6, 8 and 9 are substituted into Equation 7, the resultant is Equation 3 which is the equation of the Doppler-frequency versus time curves. Thus Equation 7 is the general equation of the Doppler-frequency versus time cruves. The present invention is directed to the concept of providing a mechanical plotter or tracer which traces cruves defined by Equation 7 and which has two calibrated adjustments for the parameters $a$ and $b$ to determine therefrom the miss distance and relative velocity between a moving target and projectile or between a moving source of electromagnetic energy and a moving object.

In accordance with the teachings of this invention, the mechanical device provided by the invention to accomplish this consists basically of a lever system formed by a plurality of pivotally interlinked lever arm means interconnectably driven by the combined motions of a translatable main carriage and a sub-carriage translatable therewith and movable in a direction transverse to that of the main carriage. More specifically, the plurality of interlinked lever arm means include a scotch yoke to generate a curve defined by the equation $Y = a \cos \theta$ which is unrelated to the X coordinate of X and Y rectangular coordinates, and an L-shaped member relating $\cos \theta$ to the X coordinate such that $$\cos \theta = -\frac{X}{\sqrt{X^2+b^2}}$$

whereby the resultant interaction is the generation of a curve by the base of the scotch yoke which curve is defined by Equation 7, i.e., $$Y = -\frac{aX}{\sqrt{X^2+b^2}}$$

As to constructional interlinkage, the L-shaped member has an adjustable guide pin in the short leg thereof with which the scotch yoke is interlinked, the scotch yoke being defined by a U-shaped projection extending transversely from the linearly configured sub-carriage which is supported for longitudinal movement on the main carriage and has a scriber at one end thereof; and the long leg of the L-shaped member has a substantially coextensive channel formed therein which is ridably and pivotably mounted on an adjustable pivot pin supported on the base of the plotter assembly, the elbow of the L-shaped member being pivotally supported, for rotation in a plane parallel to the main carriage, by a pivot pin on the main carriage which is mounted for linear movement on linear track, or guide, means. The adjustable parameters $a$ and $b$ are determined by the selective positioning of the adjustable guide pin and the adjustable pivot pin, respectively, which are suitably calibrated.

In interrelational functioning of the aforedescribed assemblage of interlinked components, as the main carriage moves on the linear track means, the pivot pin on the main carriage drives the elbow of the L-shaped member in a straight line thereby causing the channel in the long leg of the L-shaped member to slidably pivot, under influence of the positioning of the adjustable pivot pin, on the adjustable pivot pin whereupon the adjustable glide pin on the short leg of the L-shaped member glides in the U-shaped projection, or scotch yoke, from the sub-carriage and is effective to impart to the sub-charriage controlled linear motion in accordance with the positioning of the glide pin, the motion of the sub-carriage being transverse or normal to the motion of the main carriage. As a consequence of such interaction and interrlated movements of the components, a scriber attached to one end of the sub-carriage traces curves, the dimensions of which are determined by the positionings of the adjustable guide pin and adjustable pivot pin and the equation of which is defined by $$Y = -\frac{ax}{\sqrt{X^2+b^2}}$$

In utilizing the aforedescribed curve plotter for analyzing Doppler-frequency versus time curves of a field record, the field record is centered on the plotter's record-receiving platform which is traversed by the scriber in a curve path determined by the settings on the two calibrated adjustments, i.e., the adjustable guide and pivot pins. Then the calibrated adjustments, $a$ and $b$, are manually varied until the curve drawn by the scriber matches identically the curve on the field record. Upon coincidence of the scriber curve with the field record, the calibrated adjustments are read to obtain relative velocity and miss distance factors which are multiplied by constants to obtain the actual relative velocity and miss distance, the calculations being accomplished by inserting the calibrated readings for $a$ and $b$ into the following equations, which are inversions of Equations 8 and 9, respectively:

$$(10) \quad V_r = a\lambda K_f$$

$$(11) \quad D = \frac{bV_r}{K_t} = ab\lambda_p \frac{K_f}{K_t}$$

Of course, it is to be understood that the quantities $K_f$ and $K_t$ are constants obtained from the manufacturer's specifications of the recorder being used and that $\lambda_p$ is known from the designated frequency of the VT fuze transmitter in the projectile.

Once having determined the parameters $a$ and $b$, the operator then sets the curve plotter to the point of closest approach, in the manner to be more fully described hereinafter, and marks the time of closest approach on the field record. This information is useful in determining the accuracy of actuation of the VT fuze with respect to the time or instant of closest approach between target and projectile. This is accomplished generally by the transmission from the fuze, upon simulated-detonative actuation thereof, of a pulse which is recorded on the Doppler-frequency record trace. The difference in time between the market instant of closest approach and pulse on the record trace is representative of the proximity of the projectile to the target at the instant of fuze actuation thereby indicating the "target-kill" effectiveness of the fuze. Of course, it is also to be understood that the time of closest approach is a relative interval of time measured from the instant of initiation of recorder operation as the zero reference instant of time, the instant of recorder operation being initiated in synchronism with the instant of projectile launching by any suitable means at the launching station. In this regard, if the recorder is carried by the target-aircraft, a radio command pulse may be transmitted from the launching station to initiate operation of the recorder in synchronism with the firing of the projectile from the launching station to establish the zero reference of time, whereas if the recorder is at the launching station for telemetering functioning with a transponder in the target aircraft, the recorder operation may be initiated by any conventional recorder power-driver synchronously operated with the projectile fire control system at the launching station.

In addition to the curve plotters utilization to directly analyze Doppler-frequency curves, it can also be used to manufacture transparent overlays with plots of families of curves of Doppler-frequency versus time merely by predeterminedly varying the calibrated adjustments for each curve of the family. The transparent overlays may then be used for approximate data analysis by superimposing the overlay on the record trace, determining which curve substantially supercoincides with the trace, and ascertaining therefrom the parameters $a$ and $b$.

The apparatus of the present invention enables a method of data analysis which, in effect, amounts to visual cross correlation between an actual record trace and an ideal curve. Consequently, accurate results can be obtained notwithstanding considerable noise on the record. Moreover, by means of the present invention much time is saved in obtaining from Doppler-frequency curves useful information in the evaluation of fire control systems and VT fuzes.

With the foregoing in mind, it is the primary object of the present invention to provide a mechanical apparatus for analyzing Doppler-frequency curves from a pair of moving objects approaching each other and extracting data therefrom for determining the relative velocity of the objects, the distance between the objects at the instant of closest approach, and the time of closest approach with respect to a reference instant of time.

Another object is to provide mechanical apparatus for expeditiously obtaining from Doppler-frequency curves useful information for evaluating the effectiveness of gun fire control systems and VT fuzes.

A further object of the invention is to provide a Doppler-frequency versus time curve analyzer which is accurate, simple and positive in operation, substantially unaffected by noise on the analyzed record trace, faster than prior art methods in analyzing Doppler-frequency record traces, and capable of being operated by technically unskilled personnel.

Still another object is the provision of a mechanical instrument for generating a family of predeterminedly configured curves to enable analyzation of data represented by such curves.

Another further object is to provide a Doppler-frequency curve plotter having two adjustments for ascertaining a pair of arbitrary parameters which enable the determination of analysis data from Doppler-frequency versus time curves.

A significant object of the invention is to provide an adjustable mechanical instrument for tracing or generating a family of curves defined by the equation $$Y = -\frac{ax}{\sqrt{X^2+b^2}}$$

where X and Y are rectangular coordinates and $a$ and $b$ are selectively arbitrary parameters which are determined by two calibrated manual adjustments in the instrument.

An essential object of the invention is the provision of a lever system comprising an L-shaped lever interlinked in such a manner with an end of a scotch yoke whereby the free end of the scotch yoke moves in a path determined by the equation $$Y = -\frac{ax}{\sqrt{X^2+b^2}}$$

where X and Y are rectangular coordinates and $a$ and $b$ are pivot positions for the L-shaped lever and scotch yoke, respectively.

An important object of the invention is to provide a plurality of interlinked lever arm means including a scotch yoke to generate a curve defined by the equation $Y = a \cos \theta$ which is unrelated to the X coordinate of X and Y rectangular coordinates, and an L-shaped member interlinked to the scotch yoke and relating $\cos \theta$ to the X coordinate such that $$\cos \theta = -\frac{X}{\sqrt{X^2+b^2}}$$

whereby the resultant interaction is the generation of a curve by the base of the scotch yoke which is defined by the equation $$Y = -\frac{ax}{\sqrt{X^2+b^2}}$$

where $a$ and $b$ are selective pivot points for the L-shaped member and scotch yoke, respectively.

Yet another object of hte invention is the provision of an instrument to manufacture transparent overlays with plots of families of curves of Doppler-frequency versus time curves which are utilizable for approximate data analysis of recorded Doppler-frequency versus time curves obtained from a pair of objects moving toward each other.

Other objects and many of the attendant advantages of this invention will be readily appreciated as the same becomes better understood by reference to the following detailed description when considered in connection with the accompanying drawings in which like reference numerals designate like or corresponding parts through the figures thereof and wherein:

FIG. 3(a) illustrates a Doppler-frequency versus time curve in rectangular coordinates and the equation thereof for a pair of moving objects approaching each other, whereas FIGS. 3(b) and 3(c) illustrate respectively a recorded and generalized equivalent curves of FIG. 3(a) along with their respective equations;

FIG. 7 is a plan view of the mechanical linkages of FIGS. 4 and 6 operationally interlinked in accordance with the teachings of the invention and illustrates the fundamental mechanical movements involved in the formation of a Doppler-frequency curve-tracing device in accordance with the concept of the present invention;

Figure 9:
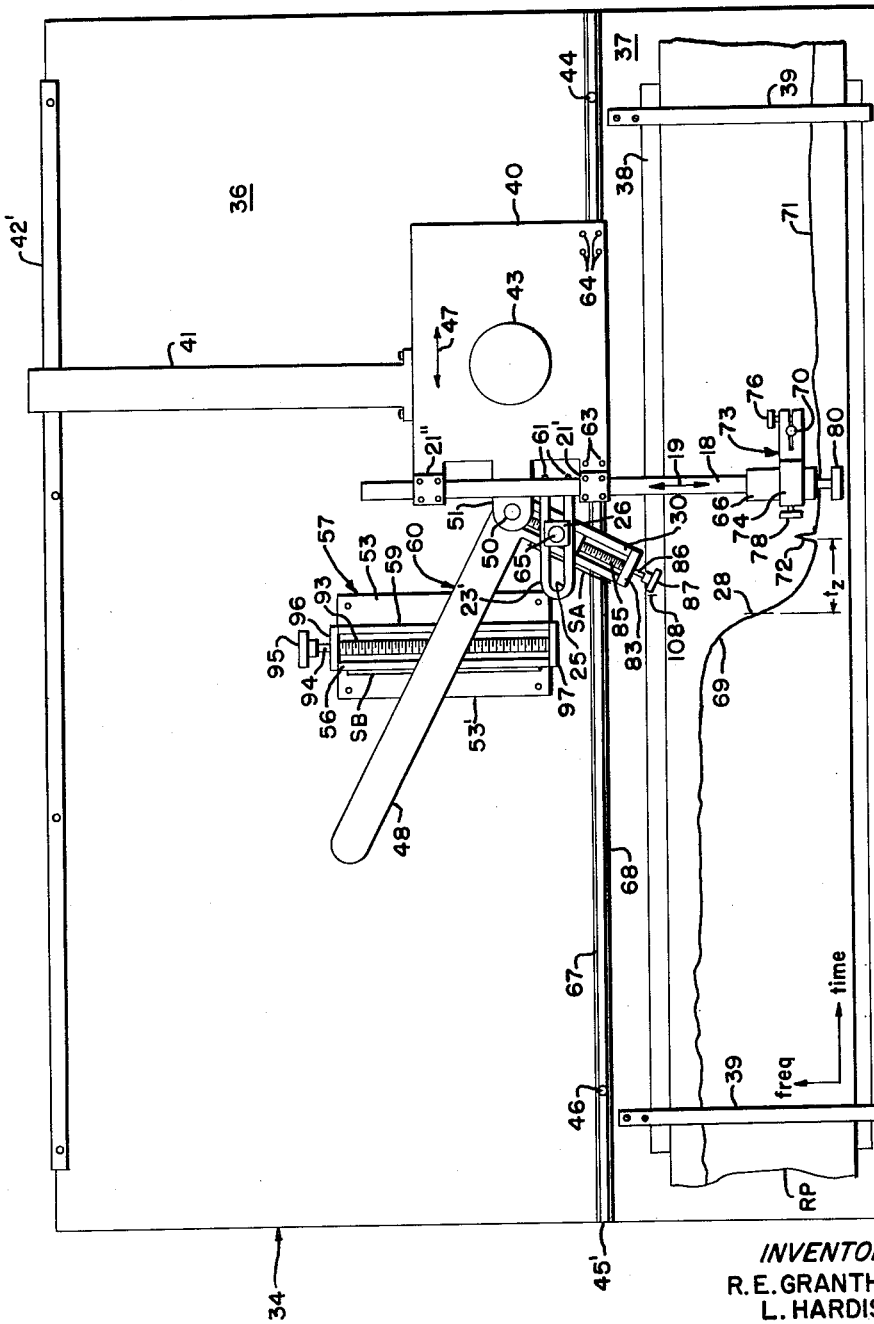
FIG. 9 is a plan view of a preferred constructional form of the present invention.
Figure 10:
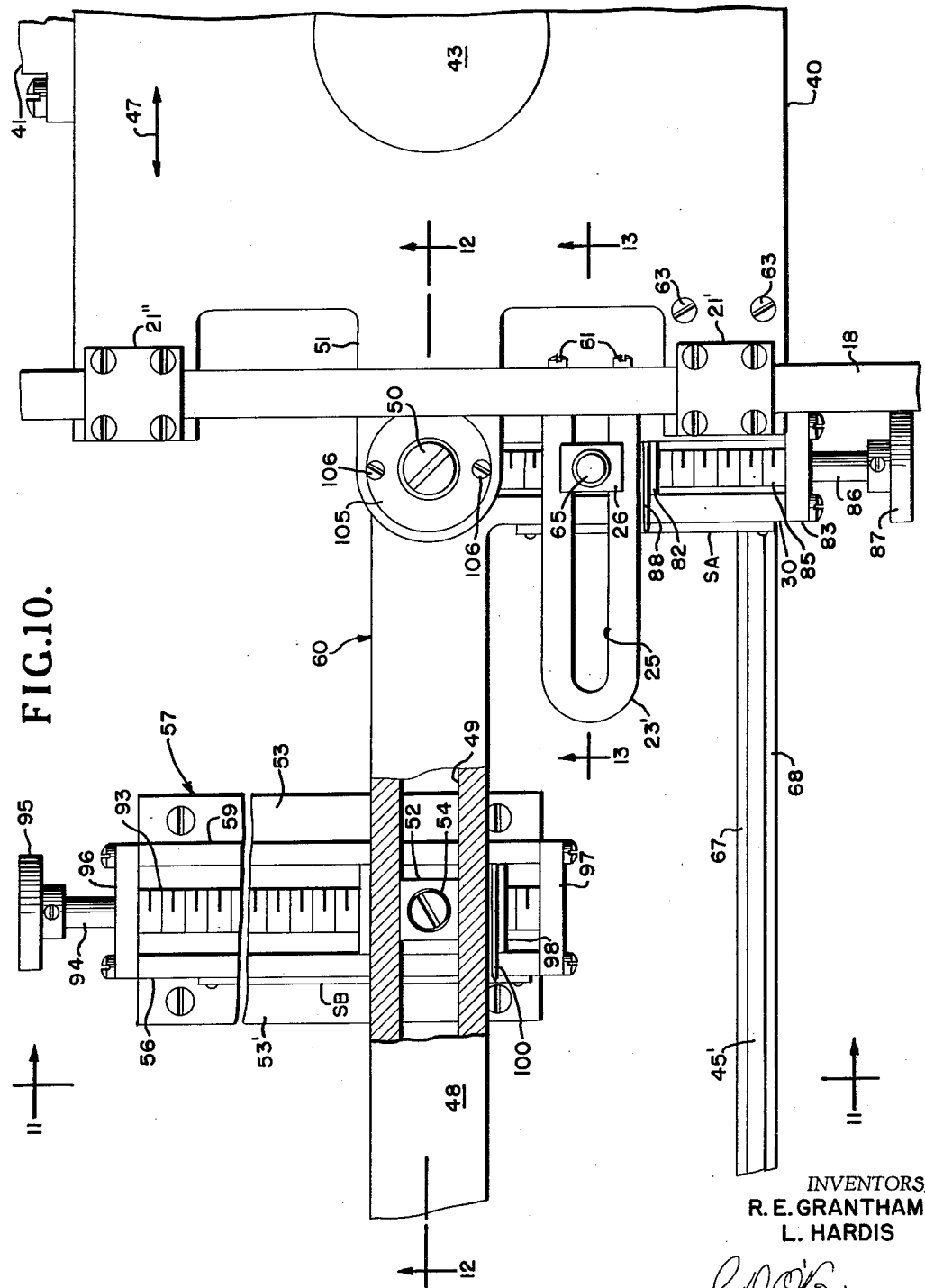
Figure 11:
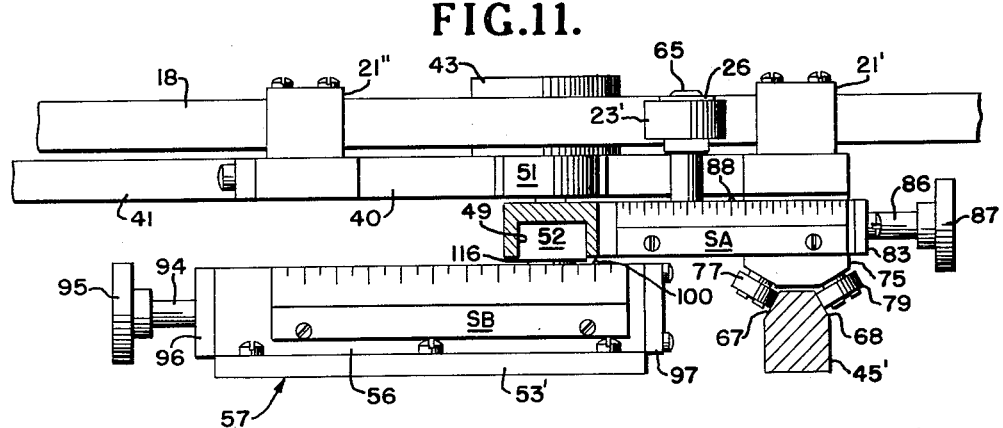
Figure 12:
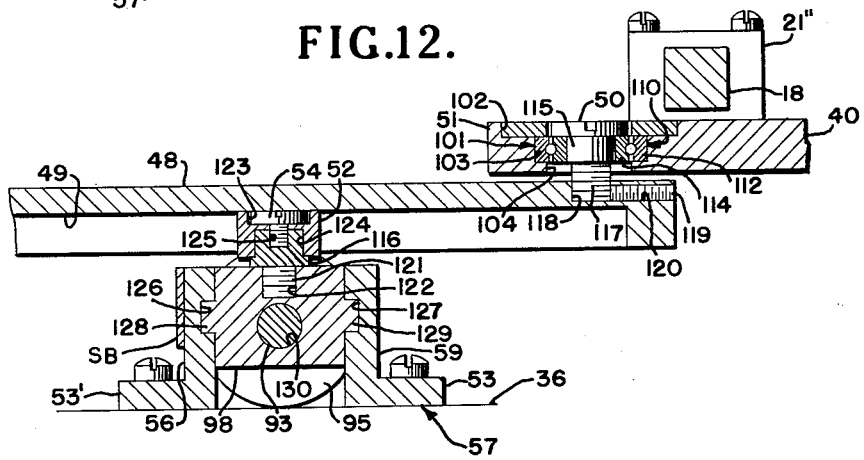
Figure 13:
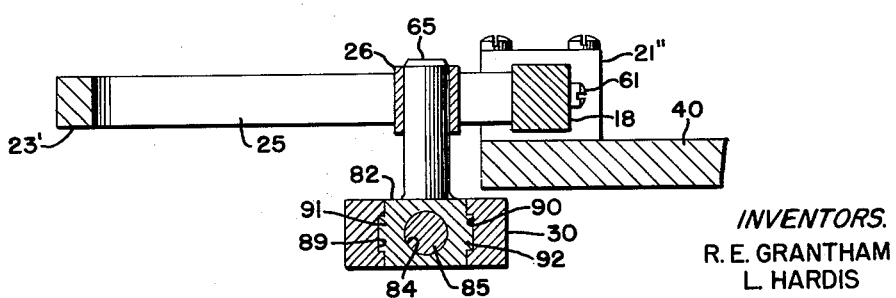

FIG. 10 is a fragmentary enlargement, partly in section, of the vital mechanical movements of the device illustrated in FIG. 9 with the L-shaped member positioned such that the long arm thereof is parallel to the direction of movement of the main carriage, such positioning more facilely illustrating the mechanical interrelationship of the parts; and FIGS. 11, 12 and 13 are fractional sectional elevations taken on the lines 11—11, 12—12 and 13—13, respectively, of FIG. 10.

Figure 1:
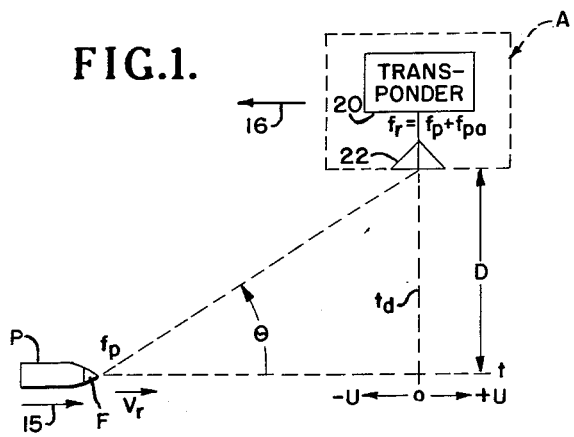
FIG. 1 shows a continuous wave transmitting projectile and a receiving-recording drone, or target, moving in opposite directions toward each other and illustrate the geometry of the projectile-target intercept thereof.

Referring now to the drawings, there is shown in FIG. 1 a moving source of electromagnetic energy, represented by a projectile P having a continuous-wave transmitter in the form of a VT fuze F radiating a signal of frequency $f_p$ and travelling in the direction of the arrow 15, and a signal-receiving moving object A such, for example, as a target-aircraft or drone carrying either an FM receiver and recorder (not shown) or a transponder 20 comprising a device for receiving pulses from one circuit and transmitting corresponding pulses into another circuit with antenna 22 which receives and telemeters the received signal to the launching station of the projectile, the drone travelling in the direction of arrow 16. The signal received by antenna 22 is the radiated signal $f_p$ shifted an amount $f_{pa}$ resulting from the Doppler frequency-shift effects whereby the resultant frequency received at the target A is $f_r = f_p + f_{pa}$. Since the relative velocity of P and A and the changing distance between P and A are functions determinative of the Doppler frequency shift as hereinbefore described, the Doppler frequency $f_{pa}$ portion of the received signal $f_r$ is utilized to determine relative velocity $V_r$ and miss distance D (which is the shortest distance between P and A of the instant of closest approach $t_d$). The Doppler frequency shift $f_{pa}$ is given by Equation 1 which is here reproduced for the sake of explanatory continuity.

(1) $$f_{pa} = \frac{V_r}{\lambda_p} \cos \theta$$

From the geometry of FIG. 1, the equation for $\cos \theta$ is:

(10) $$\cos \theta = \frac{-U}{\sqrt{U^2 + D^2}}$$

Here the origin for the U coordinate is placed at the point of closest approach $t_d$ at which instant the shortest distance, or miss distance, between target A and projectile P is represented by D. Due to the relative motion between projectile P and target A, the parameter U is a function of time as follows:

(11) $$U = V_r(t - t_d)$$

where $t_d$ is the time at which the projectile reaches the point of closest approach, and where $t$ is a coordinate in terms of time. Substituting Equation 11 into Equation 10,

(12) $$\cos \theta = \frac{-V_r(t-t_d)}{\sqrt{V_r^2(t-t_d)^2 + D^2}} = \frac{-(t-t_d)}{\sqrt{(t-t_d)^2 + \frac{D^2}{V_r^2}}}$$

By substituting Equation 12 into Equation 1, obtained is the equation

(13) $$f_{pa} = -\frac{V_r}{\lambda_p} \frac{(t-t_r)}{\sqrt{(t-t_d)^2 + \frac{D^2}{V_r^2}}}$$

Equation 13 is the equation for the Doppler-frequency versus time curve of which a plot thereof is shown in FIG. 3(a). From the equation and curve of FIG. 3(a), it is evident that, if the Doppler curve is recorded, the curve may be analyzed to determine the miss distance and relative velocity.

In order to obtain a record trace of the Doppler frequency curve, the drone A may carry an FM receiver (not shown) including any suitably conventional frequency discriminator to extract the Doppler frequency $f_{pa}$ from the received signal $f_r$ and feed the Doppler frequency $f_{pa}$ to a suitable photographic paper recorder. On the other hand, a transponder 20 may be employed to telemeter the Doppler frequency information to the projectile-launching station where it is recorded. In either event, the speed of the record paper and the sensitivity deflection of the recorder are factors introduced into the recorded Doppler-frequency curve, the values of these factors being known from the specification of the recorder being used.

With the speed of the paper being given the designation of $K_t$ in terms of inches per second, the X coordinate of the recorded curve is:

(14) $$X = K_t(t - t_d)$$

Designating deflection sensitivity as $K_f$ in units of cycles per second per inch, the Y coordinate of the record trace is:

(15) $$Y = \frac{f_{pa}}{K_f}$$

Substituting Equations 14 and 15 into Equation 13, the equation of the record trace to be analyzed and shown in FIG. 3(b) is:

(16) $$Y = -\frac{V_r}{K_f \lambda_p} \frac{X}{\sqrt{X^2 + \left(\frac{K_t D}{V_r}\right)^2}}$$

To obtain the generalized equation for Equation 16, set:

(17) $$a = \frac{V_r}{K_f \lambda_p}$$

(18) $$b = \frac{K_t D}{V_r}$$

Substituting (17) and (18) into (16), we obtain:

(19) $$Y = -\frac{aX}{\sqrt{X^2 + b^2}}$$

which is illustrated in FIG. 3(c).

Figure 2:
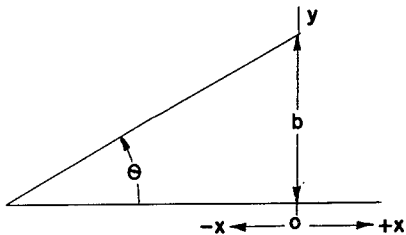
FIG. 2 is an explanatory geometrical equivalent of the projectile-target intercept of FIG. 1.

Note that when (14) and (18) are substituted into Equation 12, it becomes:

(20) $$\cos \theta = \frac{-X}{\sqrt{X^2 + b^2}}$$

where $\theta$ and $b$ are shown geometrically in FIG. 2. Substituting Equation 20 into the generalized Equation 19, the equation for the record trace becomes:

(21) $$Y = a \cos \theta$$

The construction of the mechanical curve plotter in accordance with the fundamental principles of the present invention comprises basically two mechanical linkages to generate Equation 19. The linkage used to obtain $Y = a \cos \theta$, where $\theta$ is the independent variable and is not yet constrained to vary with X as in Equation 20, is the scotch yoke of FIG. 4 and consists of a T-shaped member 17 having a linear leg 18 slidably movable, in the directions of arrows 19, on a guide bearing member 21, and a cross-bar 23 having formed therein a linear slot 25 in which rides a rotatable sliding follower-block 26 pivotally mounted on a pivot pin 24 on the end of a crank arm 32 which is pivoted at 35 and is of selectively predetermined length $a$. The reference axis for $\theta$ is line 33. As the T-shaped member is moved back and forth in the directions of arrows 19, the block 26 moves in a path in accordance with the equation $Y = a \cos \theta$ wherein $\theta$ is unrelated with respect to an X coordinate and $a$ is a selectively variable parameter.

Figure 5:
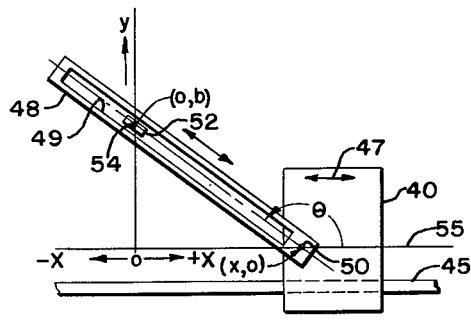
FIG. 5 is a simplified pivotal system illustrating the geometrical considerations involved in the formation of another mechanical linkage of the device of the present invention.

Now to discuss how the relationship of $\theta$ to X given by Equation 20 is obtained mechanically, reference is made to FIG. 5. A main carriage 40 is ridably mounted on a linear track 45 secured on a suitable supporting structure (not shown) in a substantially horizontal plane. The X axis is parallel to the track and the independent X coordinate $(x,o)$ is set at will by manually moving the carriage along the track as indicated by the arrows 47. An elongated pivotal member 48, having a longitudinally linear slot 49 formed therein, is pivotally mounted at one end thereof on a pivot pin 50 $(x,o$ coordinate) carried by the carriage 40, whereby the member 48 swings in a substantially horizontal plane, i.e., in a plane substantially parallel to the aforesaid supporting structure. A rotatable follower block 52, provided for disposition within slot 49 to guide the movement of member 48, is rotatably mounted on a pivot pin 54 which is adjustably fixed at a point having coordinates $X = o$ and $Y = b$. The placement of pivot pin 54 determines the position of the Y axis, with the pivot pin 54 being selectively positionable along the Y axis by an operator. A line 55 passing through the pivot 50 and parallel to the track 45 determines the X axis and also represents the reference axis for $\theta$. The slot 49 slidably engages the follower block 52 so that, regardless of the X coordinate of the carriage, the pivotal member 48 passes through two points, one point 50 on the carriage having coordinates $x,o$ and the other at pivot pin 54 having the coordinates of $o,b$.

Figure 6:
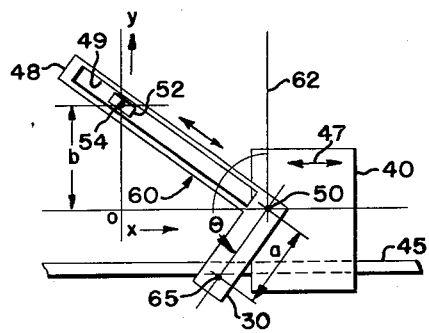
FIG. 6 is a modification of the system of FIG. 5 and illustrates the changes necessary to relate the mechanism of FIG. 5 to the scotch yoke of FIG. 4 in the manner to generate the desired curves.
Figure 4:
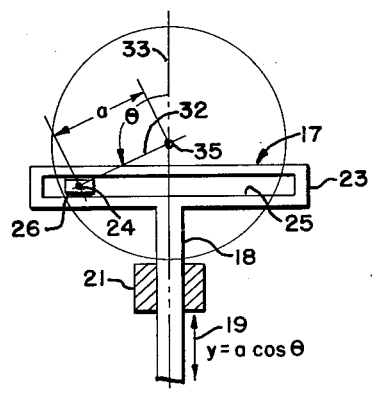
FIG. 4 is a generalized scotch yoke illustrating the basic principles of one of the mechanical linkages involved in the formation of the mechanical curve-tracing device of the invention.

Now, since the mechanism of FIG. 5 relates $\theta$ to X according to Equation 20, it remains to interlink the mechanism of FIG. 5 with the scotch yoke of FIG. 4 to generate the function of Equation 21 and to finally relate Y and X as in Equation 19. However, it is to be noted that the reference axis 55 for $\theta$ in FIG. 5 is displaced 90 degrees from the reference axis 33 in FIG. 4. Hence, a scotch yoke connected to the pivotal member 48 of FIG. 5 would plot on the Y axis the sine $\theta$ rather than the desired cosine $\theta$. Therefore, before the mechanisms of FIGS. 4 and 5 can be interlinked to obtain the desired relationship, a right-angle extension 30 must first be added to the pivotal member 48 to serve as the crank arm 32 of the scotch yoke, as shown in FIG. 6. The right-angle extension 30, when added to member 48, forms an L-shaped member, indicated generally as 60 in FIG. 6 wherein the new reference axis 62 for $\theta$ is also shown. Since the extension 30 is to serve as the crank arm 32 (FIG. 4) for the scotch yoke, an adjustably positionable pivot pin 65 (counterpart of pivot pin 24 in FIG. 4) is provided thereon for receiving the follower block 26 (FIG. 4) of the scotch yoke and is positioned the distance $a$ (length of crank arm 32 in FIG. 4) from the pivot pin 50.

Now the mechanisms of FIGS. 4 and 6 may be interlinked for conjoint functioning to generate a curve defined by Equation 19, the manner of interlinkage being shown in FIG. 7 to which reference is now made. The guide bearing member 21 of the scotch yoke is securely affixed to main carriage 40 so that leg 18 is linearly movable in the directions of the arrows 19. Since the movement of leg 18 is transverse to the movement of main carriage 40 and controllably drives the slotted cross-bar 23, the leg 18 in effect is a sub-carriage translatable with the main carriage but having linear movement transverse to the linear movement of the main carriage. As the main carriage 40 is moved along the track 45 in the directions of arrows 47, the pivot pin 50 drives the elbow of the L-shaped member 60 in a straight line thereby causing member 60 to swing about pivot pin 50 while simultaneously the slot 49 in the longer arm 48 pivotally slides on follower block 52 in a manner determined by the parameter $b$. Meanwhile, the extension arm, or short leg, 30 also swings in a manner determined by the relative positioning of pivot pin 54 with respect to the X axis of pivot pin 50, whereupon follower block 26 slides in slot 25 to impart linear motion, in the direction of arrows 19, to the sub-carriage 18 as determined by the dimension $a$. As a consequence of the dependency of the aforedescribed interactions on the values of $a$ and $b$ and due to the geometrically-considered mechanical interlinkage of the L-shaped member with the scotch yoke, a scriber 70 such, for example, as a pen or pencil on the end of sub-carriage 18 traces a curve defined by the generalized Doppler-frequency vs time curve equation $$Y = -\frac{aX}{\sqrt{X^2 + b^2}}$$

as the main carriage travels along track 45 from one end thereof to the other end.

The foregoing description in conjunction with FIGS. 4 to 7 presents the basic inventive concepts involved in the derivation of the fundamental mechanical principles upon which the design of a Doppler-frequency curve analyzer depends. From the foregoing, it is apparent that a mechanical curve plotter to generate the Equation 19 comprises basically an L-shaped member and a scotch yoke mutually interlinked and mounted on a common carriage, with the L-shaped member being pivotally mounted at the elbow thereof on the main carriage and slidably supported at the long leg thereof by an adjustably positionable pivot, the scotch yoke being interlinked therewith by a selectively positionable pivot pin carried by the short leg of the L-shaped member. The arrangement of FIG. 7 is generically representative of the mechanical linkages and movements in accordance with the teachings of the present invention to provide a mechanical instrument which generates a family of curves defined by Equation 19, the principles and interrelationships of the components in FIG. 7 being utilizable to construct a Doppler frequency curve plotter of any desired constructional design.

Figure 8:
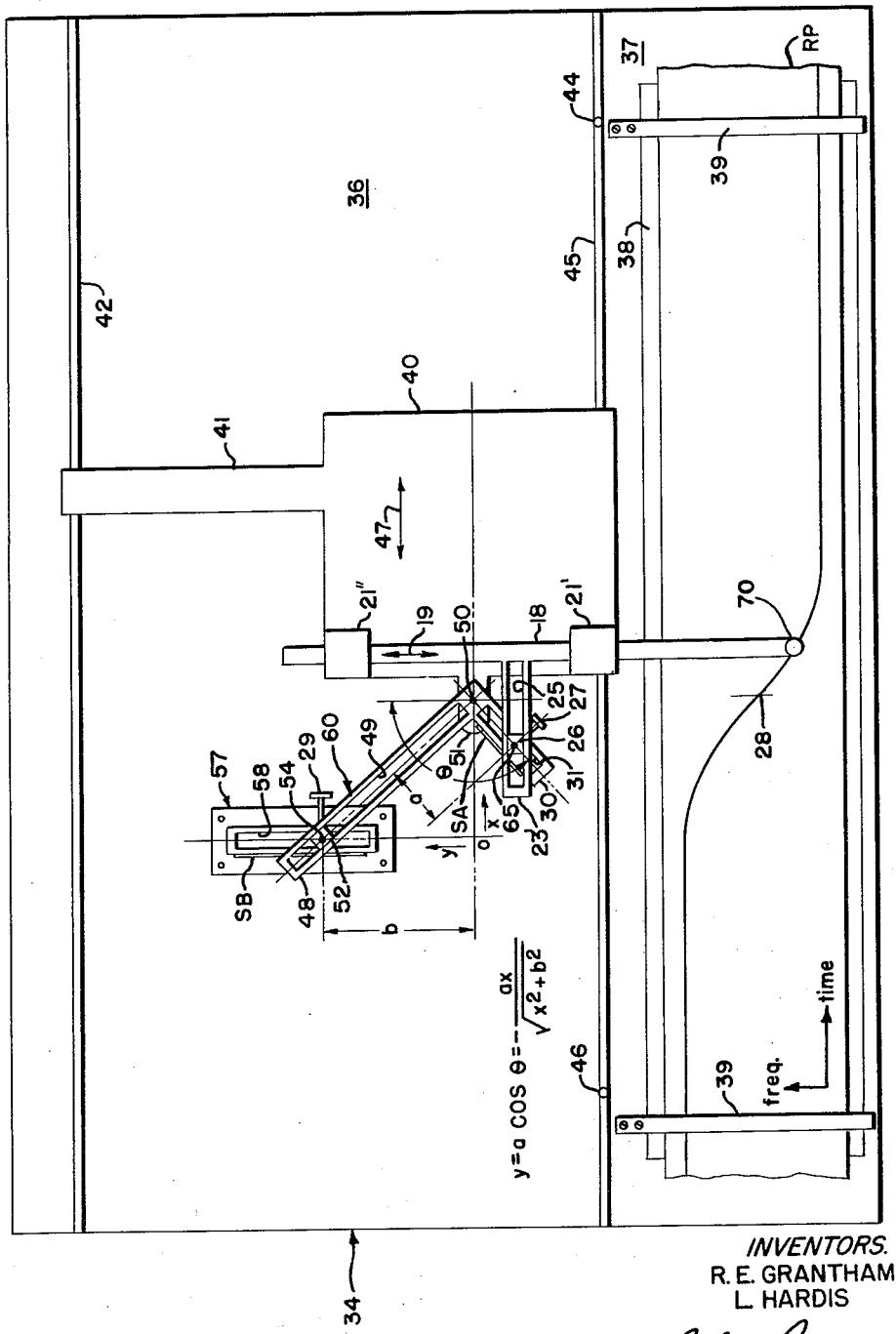
FIG. 8 is a simplified mechanical embodiment of the invention illustrating the manner in which the fundamental mechanical movements presented in FIG. 7 may be utilized to devise a Doppler-frequency curve plotting instrument.

In its broader aspect, a simplified mechanical embodiment of the present invention is illustrated in FIG. 8 and includes a main frame or base, indicated generally as 34, having a planar surface 36 on which the various parts of the instrument are mounted and a record-receiving platform 37 coplanar with surface 36 and supporting a ground-glass plate 38 under which a lamp (not shown) is mounted. A pair of straps 39 are provided to firmly hold the record paper RP in place. The main carriage 40 has an extension 41 whereby the carriage 40 rides, by any suitable means as wheels or ball-bearings for example, coplanarly with surface 36 on a pair of linear tracks 42, 45 which are mutually parallel for guiding the movement of carriage 40 in the directions of the arrows 47, a pair of stops 44 and 46 limiting the extent of travel of carriage 40.

The scotch yoke is formed by a linear sub-carriage 18, preferably in the form of a bar of square cross-section, which is mounted on carriage 40 by a pair of guide bearing means 21' and 21" for sliding movement in the direction of arrows 19, and a U-shaped projection 23' extending normally from sub-carriage 18 to form a slot 25 within which slides follower block 26. It is to be noted that, since the pivot pin 65 of follower block 26 travels through only an arc of 90 degrees, the U-shaped extension 23' is adequate to serve the purpose and it is not necessary to employ a slotted cross-bar as shown at 23 of FIGS. 4 to 7. Attached to or formed integral with carriage 40 is a projection 51 on which is mounted pivot pin 50 upon which L-shaped member 60 is mounted at its elbow for pivotal movement thereabout.

The L-shaped member 60 is substantially the same as that described for FIG. 6 with the exception that short arm 30 has a slot 31 formed therein for receiving a pivot pin 65 which is adjustably positioned along slot 31 by means of a lock-screw 25, a calibrated scale SA being secured to arm 30 to indicate the position of pivot pin 65. Secured to surface 36 by means of screws is a pivot supporting assembly 57 having a channel 58 within which pivot pin 54 is longitudinally positionable by means of lock-screw 29, a follower block 52 being rotatably mounted on pivot pin 54 and slidable in the slot 49 of long arm 48. From the foregoing description, it is apparent that the arrangement of FIG. 8 is the mechanical equivalent of FIG. 7.

In utilizing the device of FIG. 8 to analyze a Doppler-frequency vs time record trace, the record is centered on top of the ground glass 38 and then a sheet of acetate film with a matte surface is placed on top of the record to provide an erasable writing surface for the curve plotter, it being understood that straps 39 hold the record and film firmly in place. The scriber 70 draws an ideal Doppler curve on the acetate film when the operator moves the carriage from stop 44 to 46. The record shows through the film, so, in effect, the two curves are superposed. The values of the $a$ and $b$ parameters are then adjusted, by loosening screws 27 and 29 and positioning pivot pins 65 and 54, until the curve traced by scriber 70 identically matches the record trace, the $a$ parameter being adjusted first. The operator then reads the $a$ and $b$ values, which are in inches, from their respective scales and computes the miss distance and relative velocity from Equations 10 and 11.

After the record trace has been matched with the plotter, the point or time of closest approach is marked, as indicated at 28, by moving the long arm 48 parallel to the Y axis, the point of closest approach falling on the center of the slope of the curve. It is to be noted that the curve plotter only traces a Doppler curve which decreases from right to left. If the field record increases from right to left, it is placed on the ground glass face down, and the lamp under the glass is turned on. The record can then be viewed through the paper backing and it will be inverted to match the plotter curve.

Reference is now made to FIGS. 9 to 13 wherein is shown a preferred mechanical construction of the invention, parts thereof corresponding to those in FIG. 8 having the same reference numerals and like parts in FIGS. 9 to 13 have corresponding reference numerals. Referring particularly to FIG. 9, mounted on planar surface 36 of base frame 34 are a pair of parallel-disposed linear tracks 42' and 45' of which track 42' may be formed of either a flat runner or metal angle bracket secured by screws to one edge of frame 34 as shown, whereas track 45' consists of an elongated bar of rectangular cross section with bevelled edges 67 and 68 formed thereon to define bearing surfaces upon which ride the bearing wheels of a pair of bearing blocks secured to the underside of main carriage 40 by means of sets of screws 63 and 64. FIG. 11 more clearly illustrates the positioning on bearing surfaces 67 and 68 of wheels 77 and 79 rotatably mounted on bearing block 75 which is secured to the underside of carriage 40 by screws 63, it being understood that a similar bearing block-wheel assembly is secured rearwardly of block 75 by screws 64 (FIG. 9).

Returning to FIG. 9, one end of flat extension arm 41 is screwed to the edge of carriage 40 so that arm 41 is substantially coplanar with carriage 40; and, the other end of arm 41 is provided with wheels (not shown) secured to the underside thereof and positioned to ride on track 42', the wheels being of such diameter as to maintain the main carriage 40 in a plane parallel to planar surface 36. To manually move the carriage 40 on the tracks and in the direction of arrows 47, a cylindrical handle 43 vertically attached to carriage 40 and substantially centrally located thereon for balance is provided, it being understood that any suitably configured handle to conveniently serve the purpose may be employed. Secured to track 45' are stops 44 and 46 which limit the extent of travel of carriage 40 on tracks 42' and 45'.

Subcarriage 18, preferably of square cross-section, is mounted on carriage 40 by means of guide bearing members 21' and 21" which are secured to carriage 40 by means of screws or the like, bearing members 21', 21" having aligned channels configured to receive subcarriage 18 and permit sliding movement therethrough of subcarriage 18 in the direction of arrows 19. It is to be noted that the direction of movement of subcarriage 18 is transverse to the movement of main carriage 40. A scriber 70 such, for example, as a pen or pencil is fastened to pen-holder assembly generally indicated as 73, by lock-screw 76, assembly 73 having a mounting sleeve portion 74 which is provided with a channel of square-cross section that slidably fits over bearing block 66 which is adjustably secured to the end of subcarriage 18 by a lead screw 80. In order to provide a Y centering adjustment, lead screw 80 has a threaded shaft (not shown) housed within bearing 66 and threadedly engaged thereto for selectively adjusting (in the direction of arrows 19) bearing 66 on subcarriage 18, sleeve 74 being slidably adjustable on bearing 66 and securely positioned by lock screw 78. In this manner, the Y centering may be coarsely adjusted by manually sliding sleeve 74 and then finely adjusted by rotating lead screw 80.

Formed integrally with and extending laterally from carriage 40 is an extension stub 51 having formed therein a tri-dimensional bore 101 (FIG. 12) within which pivot pin 50 is rotatably supported by ball bearing unit 110. As is illustrated in FIG. 12, pin 50 has a smooth shaft portion 115 which is press-fitted within inner sleeve 114 of ball bearing unit 110 for rotation therewith and is further provided with a threaded shaft portion 117 extending through lower bore portion 104 for threaded engagement within threaded bore 118 at the elbow of L-shaped member 60, a lock screw 114 being provided to securely affixed threaded shaft 117 to member 60 whereby member 60 swings in a plane parallel to carriage 40 via rotation of pivot pin 50 in ball bearing unit 110. The outer sleeve 112 of ball bearing unit is conformingly press-fitted into intermediate bore portion 103 of tri-dimensional bore 101 and securely housed therewithin by annular disc 105 which is seated in upper bore portion 102 and fastened thereto by screws 106 (FIG. 10).

Referring now to FIGS. 9 and 10 and more particularly to FIG. 10, a U-shaped member 23' has the ends thereof fixedly attached to subcarriage 18 by screws 61 and is disposed so that the guide slot 25 of member 23' is perpendicular to the direction of movement of subcarriage 18. Seated for sliding movement in slot 25 is follower block 26 rotatably mounted on pivot pin 65 which is attached to lead screw 85 mounted in short arm 30 of L-shaped member 60, as will be more fully described hereinafter in connection with FIG. 13. One end of lead screw 85 is supported at the elbow of L-shaped member 60 and has an integral extension shaft 86 which is rotatably supported in a bore formed in bearing end-plate 83 screwed to the end of short arm 30, screw cap 87 being secured to shaft 86 to enable manual rotation of lead screw 85 to drive pivot-pin mounting block 82 whereby pivot pin 65 is selectively positioned along the longitudinal axis of short arm 30. An indicator 88 is securely attached to mounting block 82 for movement therewith and appropriately disposed relative to a calibrated scale SA (more clearly shown in FIG. 11) attached to the side face of short arm 30 to provide the $a$ parameter for the hereinbefore mentioned equation (7).

With reference to FIG. 13 for describing the mechanism of pivot pin 65, it is seen that the sides of short arm 30 have grooves 89 and 90 within which slide shoulders 91 and 92, respectively, of mounting block 82 which forms the base of pivot pin 65 and is driven by rotation of lead screw 85 rotating within threaded bore 84 formed in block 82. Pivot pin 65 may be formed integral with block 82 or may be securely threaded thereto.

With particular reference to FIGS. 10 and 12, the long arm 48 of L-shaped member 60 has a cross-section of inverted U-shaped configuration (FIG. 11) to define a channel 49 which pivotally slides on follower block 52 which is rotatably supported by screw-type pivot pin 54 on cylindrically-shaped mounting block 116 having a central threaded bore 125 and threaded shaft 121. In order to effect the desired mounting, follower block 52 is provided with an upper circular cavity 123 within which the head of pivot pin 54 is recessed and a lower cylindrically-formed recess 124 which fits over mounting block 116, the depth of threaded bore 125 being such relative to the length of the threaded shaft of screw-type pivot pin 54 that the cap of pivot pin 54 loosely abuts the bottom surface of recess 123 to enable free rotation of follower block 52.

The pivot supporting assembly 57 consists of a pair of angle-shaped members which are defined by mounting flanges 53, 53' with respective side plates 59, 56, grooves 127 and 126 being formed respectively in plates 59 and 56 and flanges 53 and 53' being securely screwed to planar surface 36 of base 34. Shoulders 128 and 129 of adjustable guide block 98 are slidably mounted in grooves 126 and 127, respectively, whereby guide block 98 is adjustably positionable by rotation of lead screw 93 in threaded bore 130. The lead screw 93 is provided with an extension shaft 94 and cap 95 to permit manual rotation thereof and is rotatably mounted at its opposite ends in suitable bores formed in bearing end plates 96 and 97 which are attached to the ends of side plates 56 and 59 by means of screws, the longitudinal axis of lead screw 93 being perpendicular to the line of movement of carriage 40 as represented by arrows 47. The mounting block 116 is securely affixed to guide block 98 by screwing threaded shaft 121 in the threaded bore 122 of guide block 98. Attached to the side plate 56 is the calibrated scale SB for indicating the value of the $b$ parameter, as indicated by the position of the indicator 100 carried by guide block 98.

It is to be understood that the graduations on scales SA and SB shown in FIG. 11 are not drawn to true scale but are merely for purpose of illustration. In preferred practice, the range of the SA scale is from 0.71 inch to 2.21 inches while the SB scale ranges from 0 to 4.2 inches. The distance between stops 46 and 44 (the X axis) is 24 inches with the longitudinal axis of lead screw 93 (the Y axis) being equidistantly spaced from stops 46 and 44.

With reference to FIG. 9 as to the operation of the device, the record paper RP with Doppler frequency record trace 71 is mounted over ground glass 38 and is held in centered position by straps 39. The record trace centering, which is the X centering, is roughly accomplished by moving the record paper RP left and right until the center of the curve-slope 69 is substantially in alignment with the longitudinal axis of lead screw 93 plus the distance of scriber 70 from the axis of bar 18, as represented by indicial line 108. Of course, it is to be understood that if scriber 70 is mounted on the longitudinal axis of bar 18, the X centering is in alignment with the longitudinal axis of lead screw 93. The Y centering is attained by loosening screw 78 and sliding sleeve 74 forward and backward until the upper and lower extent of travel of scriber 70 is centered relative to the apex and base of slope 69 whereupon screw 78 is tightened and the screw 80 rotated to finely adjust the Y centering. A sheet of acetate film with a matte surface (not shown) is placed over the record paper RP and held in place by straps 39, the matte surface facing upwardly to present an erasable writing surface for the scriber 70. Lead screw caps 95 and 87 are then adjusted until the curve traced by scriber 70 supercoincides with record trace 71, whereupon the readings indicated by indicators 100 and 88 on scales SB and SA are noted to provide the parameters $b$ and $a$ which are used to obtain miss distance D and relative velocity $V_r$ by substituting the parameters in Equations 11 and 10.

After the record trace has been matched, the point or time of closest approach is established by moving the carriage 40 so that the long arm 48 of the L-shaped member 60 is parallel to subcarriage 18 and making the mark 28 which, in actual practice, substantially bisects the slope 69. The notation of time of closest approach is of value in determining the accuracy and effectiveness of the VT fuze in the projectile. The determination of the distance measured along the trajectory (referred to hereinafter as the Z distance) of the projectile from the time of closest approach to the target-aircraft to the time of fuze actuation is possible. In practice, the VT fuze transmits a pulse at the instant of fuze actuation, which signal is received and incorporated on the record trace as pulse 72 by the recorder located at either the target-aircraft or launching station. The Z distance is determined by measuring from the record trace the time between fuze actuation pulse 72 and the time of closest approach 28, it being understood that record paper RP is provided with time indicia or graduations. This time difference, indicated by $t_z$, determines the Z distance by substituting in the following equation:

$$(22) \qquad Z = t_z V_r$$

Of course if filter circuits are used in conjunction with the recorder, it is understood that it will be necessary to introduce a time correction factor in Equation 22 to compensate for time delay in the filter circuits such, for example, as using the following equation:

$$(23) \qquad Z = (t_z - t_c) V_r$$

wherein $t_c$ is the time delay caused by the filter circuits.

From the foregoing, it is apparent that the present invention provides a mechanical instrument and the fundamental principles involved in the construction thereof to enable analyzation of data represented by Doppler frequency curves and to enable such analyzation in a most expeditious, facile and accurate manner.

It should be understood, of course, that the foregoing disclosure relates to only preferred embodiments of the invention and the mechanical principles of the construction thereof in accordance with the fundamental teachings of the invention; and that numerous modifications or alterations may be made within the fundamental teachings of the invention without departing from the spirit and scope of the invention as set forth in the appended claims.

What is claimed and desired to be secured by Letters Patent of the United States is:

1. An instrument for generating a family of curves each of which is determined by a pair of mechanical adjustments in the instrument, said instrument comprising a main carriage mounted for linear movement in a predetermined plane, a sub-carriage translatably carried by said main carriage and suported thereon for linear movement transverse to the movement of said main carriage, a first mechanical adjustment including a guide member extending normally to said predetermined plane and being selectively positionable along a line parallel to the linear movement of said sub-carriage, an L-shaped member pivotally mounted on said main carriage to swing in a plane parallel to said predetermined plane as said main carriage moves and having the long arm thereof configured and disposed for longitudinal sliding movement on said guide member during the swing of the L-shaped member, a second mechanical adjustment including a guide pin extending from the short arm of the L-shaped member in a direction normal to said predetermined plane and selectively positionable along the longitudinal axis of said short arm, a projection secured to said sub-carriage and having formed therein a slot the axis of which is parallel to the movement of said main carriage and lies in a plane parallel to said predetermined plane, said guide pin being disposed for sliding movement within the slot of said projection for imparting movement to said projection which is translated to said sub-carriage to provide the linear motion thereof, and a tracing scriber supported at one end of said sub-carriage, the selective positioning of said guide member and guide pin being effective to determine the path travelled by said scriber as said main carriage is moved whereby a family of curves may be traced by selectively adjusting the positioning of said guide member and guide pin.

2. The instrument of claim 1 for generating a family of curves defined by the abscissa and ordinate of rectangular coordinates and selectively arbitrary parameters which are determined by the respective positioning of said guide pin and guide member, said instrument further including a base assembly comprising a planar mounting portion with linear guide means on which said main carriage is ridably mounted, and a planar record-receiving platform in a plane parallel to said mounting portion and disposed to be traversed by said scriber, said first mechanical adjustment being mounted on said mounting portion.

3. The instrument of claim 2, wherein said sub-carriage is a linear bar of rectangular cross-section and said projection is a U-shaped member secured perpendicularly to said bar, and further including a calibrated scale for each of said adjustments disposed to indicate the positioning of said guide pin and guide member whereby the parameters may be read from the scales.

4. The instrument of claim 3, wherein the pivotal mounting of said L-shaped member on said main carriage is at the juncture of the axes of said long and short arms.

5. A curve drawing instrument comprising a horizontal support, a rotatable runner vertically mounted on said support and selectively positionable along a straight line, a prime mover movably mounted on said support in a direction normal to said straight line and having vertical pivot means, an L-shaped member having a rotatable pivot guide selectively positionable along the axis of the short leg thereof and a longitudinal channel in the long leg thereof disposed to slide on said runner, means at the juncture of the axes of said long and short legs to pivotally mount said L-shaped member on said vertical pivot means so that said L-shaped member swings substantially in a horizontal plane in response to motion of said prime mover, a follower formed by a linear bar and a slotted projection extending perpendicularly from said linear bar, means mounting said bar on said prime mover in a manner to enable longitudinal movement of said bar, said pivot guide being disposed within the slot of said projection for guiding the movement of said bar, means for enabling controllable movement of said prime mover, and a scriber supported on the end of said bar.

6. A curve plotting mechanical device comprising two calibrated adjustments for a pair of selectively arbitrary parameters which determine desired information from Doppler frequency versus time curves comprising, in combination, a planar surface, a linear track mounted on said surface, a main carriage ridably mounted on said linear track, a pivot pin on said carriage, an L-shaped member mounted on said pin for pivotal movement in a predetermined plane, a longitudinal slot in the long arm of said member, an adjustably positionable slide guide pin securely mounted on said planar surface disposed within said slot for guiding movement of said member as the carriage traverses the track, the positioning of said guide pin determining one of said parameters, a rotatable pivot pin disposed normal to said predetermined plane and adjustably mounted on the short arm of said member, the adjustment of said rotatable pin determining the other of said parameters, a sub-carriage mounted on said main carriage for movement transverse to the movement of said main carriage, a slotted projection extending perpendicularly from said sub-carriage, said rotatable pin being disposed within the slot of said projection for guiding the movement of said projection and said sub-carriage, a tracing scriber supported on one end of said sub-carriage to trace a path determined by the positionings of said guide and rotatable pins and means indicating the two arbitrary parameters from the positionings of said guide pin and said rotatable pin whereby, upon adjustment of said guide and rotatable pins resulting in supercoincidence of said path and a curve under analysis, the desired information is determined from the two parameters.

7. A curve plotting mechanical device comprising two calibrated adjustments for a pair of selectively arbitrary parameters which determine desired information from analysis data in the form of a curve and comprising, in combination, a horizontal base with linear guide means, a main carriage ridably mounted on said linear guide means, a vertical pivot pin on said carriage, an L-shaped member mounted at the elbow thereof on said pin for pivotal movement in a predetermined plane, a longitudinal slot in the long arm of said member, a rotatable slide guide pin selectively positionable in a line transverse to the movement of said carriage and disposed within said slot for guiding movement of said member as the carriage traverses the guide means, a rotatable pivot pin adjustably mounted along the axis of the short arm of said member, a linear sub-carriage mounted on said main carriage for movement transverse to the movement of said main carriage, a slotted projection extending perpendicularly from said sub-carriage, said rotatable pin being disposed within the slot of said projection for guiding the movement thereof, a calibrated scale for the positioning of each of said guide pins and said rotatable pin to indicate therefrom said parameters, and a tracing scriber supported on one end of said sub-carriage to trace curves determined by the respective positioning of said guide pin and rotatable pin.

References Cited in the file of this patent

UNITED STATES PATENTS 2,465,481    Reiche _____ Mar. 29, 1949